(12) United States Patent
Klinger et al.

(10) Patent No.: US 8,175,928 B2
(45) Date of Patent: May 8, 2012

(54) METHOD AND SYSTEM FOR LINKING EPROCUREMENT TO VIRTUAL COMMUNITIES

(75) Inventors: Theresa Klinger, Alamo, CA (US); Ariel Wada, Larkspur, CA (US)

(73) Assignee: Pure Verticals Inc., Benecia, CA (US)

( * ) Notice: Subject to any disclaimer, the term of this patent is extended or adjusted under 35 U.S.C. 154(b) by 214 days.

(21) Appl. No.: 12/313,423

(22) Filed: Nov. 19, 2008

(65) Prior Publication Data

US 2009/0132389 A1    May 21, 2009

Related U.S. Application Data

(63) Continuation-in-part of application No. 11/968,384, filed on Jan. 2, 2008.

(60) Provisional application No. 61/043,897, filed on Apr. 10, 2008, provisional application No. 60/989,430, filed on Nov. 20, 2007.

(51) Int. Cl.
*G06Q 30/00* (2006.01)
(52) U.S. Cl. .................. 705/26; 705/14; 705/10; 705/27
(58) Field of Classification Search .................... 705/27, 705/10, 14
See application file for complete search history.

(56) References Cited

U.S. PATENT DOCUMENTS

| | | | | |
|---|---|---|---|---|
| 6,466,975 | B1 * | 10/2002 | Sterling | 709/223 |
| 7,520,430 | B1 * | 4/2009 | Stewart et al. | 235/383 |
| 7,552,323 | B2 * | 6/2009 | Shay | 713/160 |
| 2004/0078316 | A1 * | 4/2004 | Clark et al. | 705/37 |
| 2005/0149397 | A1 * | 7/2005 | Morgenstern et al. | 705/14 |
| 2007/0299736 | A1 * | 12/2007 | Perrochon et al. | 705/26 |

* cited by examiner

*Primary Examiner* — Vanel Frenel
(74) *Attorney, Agent, or Firm* — Galvin Patent Law LLC; Brian R. Galvin

(57) ABSTRACT

An e-commerce system, comprising a master console software application executing on a first network-connected server and accessible to a plurality of external systems used by merchants, a shopping cart software application executing on a second network-connected server and coupled to the first server, and interface software executing on the second server for interacting with content associated with a first user is disclosed, wherein a merchant interacts with the master console software application to load information about a product available for promotion and sale by the first user, the master console software application makes that information available to the shopping cart software application, and the interface software provides information and code related to the specific product to the content, the code compatible with the content, and upon the code being activated in the content by a second user, the second user is connected to the shopping cart software application, and is thereby enabled to buy the product.

8 Claims, 6 Drawing Sheets

METHOD AND SYSTEM FOR LINKING EPROCUREMENT TO VIRTUAL COMMUNITIES

CROSS-REFERENCE TO RELATED APPLICATIONS

The present application is a continuation-in-part to application Ser. No. 11/968,384, filed Jan. 2, 2008, and claims priority to Provisional Application Ser. No. 60/989,430, filed Nov. 20, 2007 and Provisional Application Ser. No. 61/043,897, filed Apr. 10, 2008; the disclosure of each of which is incorporated herein in its entirety, at least by reference.

BACKGROUND OF THE INVENTION

1. Field of the Invention

The present invention is in the field of e-commerce, and particularly as it pertains to virtual communities such as social networks, online gaming communities and "virtual worlds", and to business-to-business (B2B) e-commerce and supply chain (also commonly known as eProcurement) technologies. Yet more particularly, the present invention pertains to linking of B2B eProcurement networks to virtual communities in order to allow businesses to receive all traditional e-procurement services while gaining unique sales channels and advertising opportunities by participating in Virtual Communities (VC's), and allowing VC's to receive highly targeted products (and advertising) for their members to promote, buy and sell.

2. Discussion of the State of the Art

In the field of entertainment media, several trends have emerged in recent years, quite separately, that when combined offer surprising new possibilities for individuals and enterprises alike. One of these trends is emergence of product placements as a new kind of advertisement. This now familiar technique involves advertisers (a vendor of products such as personal computers, cars, liquors and toys, just to name a few) paying content creators (movie studios, TV studios and others) to display or refer to their products in prominent ways within the content itself. This is in stark contrast to previous practices in advertising, where boundaries between advertising and entertainment content were clearly defined; with product placements, commercial messages can be included within content for which consumers pay to view, and with which consumers are strongly emotionally engaged.

A second trend is democratization of content creation. In the age of the great movie studios, control of content creation (at least in new media of radio and movies) was entirely within the hands of a few very powerful businessmen. Later, as costs of high quality production came down, and as more and more channels to market became available, first through UHF television stations and later through cable and satellite systems, content creation became more diffuse, taking place across thousands of companies acting in various capacities. But only recently has serious content routinely been created by individuals, by consumers. The emergence of "user-generated content" (UGC) has been a large part of the post-2000 boom in user-centric web services, which commonly is labeled broadly as Web 2.0. Today, with blogs, personal web pages, and sites for uploading of user-generated music and video clips, more and more of what people read, hear and watch is created outside of the corporate world, in the world of UGC.

Another important trend has been emergence of highly targeted advertising. Advertising once was a mass media affair, and segmentation tended to go no further than choosing during which radio or television show to advertise. Today, Internet portal companies, search engines, marketing database companies with access to credit card and other financial data all compete to precisely target advertisements to ever more finely sliced segments of consumer populations. The rapid rise of Google has also shown how much the advertising equation has changed; while charging only a tiny fraction of what traditional media charged for advertising, and while permitting only the most rudimentary text-based advertisements, Google has grabbed a significant share and built a highly profitable business because its ad placements are highly targeted and because advertisers only pay when ads are clicked.

Finally, the last few years have seen emergence of a variety of virtual communities, self-organizing groups of individuals, usually assembled online, that engage in new forms of social interaction. Among these is a new category of web-based entity, social networks. Already there are thousands of these, ranging from very large operators such as MySpace or Facebook to very small, highly verticalized players. There is even a company selling a platform for launching new social networks. And social networking has quickly become a major outlet for user-generated content (in fact, one can view each subscriber's profile page as a form of UGC).

As is typical in web trends, original social networking pioneers offered "something for nothing", and most social networking sites continue to offer a wide range of free services. But soon after, people began seeking ways to develop profitable business models to monetize large numbers of loyal users that had been created in a very short time. Much as Google did in search, these pioneers are looking to advertising to satisfy the need to generate revenue from highly visited social networking sites, and they are typically adopting methods used by Google—allowing users to provide access to advertisers on their profile pages in return for a small slice of advertising revenue. This is by now a classical business model—site operators, user whose profile pages are used, media buyers and others all take pieces of the total advertising spend committed by advertisers (these by and large are the same kinds of companies as in all of the previous ages, plus new web-based companies).

One limitation of currently emerging models of allowing advertisers to place ads on profile pages is that it is a largely passive affair. A user can, for instance, subscribe to one of many affiliate advertising services and make a space available for ads to be displayed, but the user has no control over what ads are displayed. Advertisers will display ads that seem to correlate well with content of the page (for instance, a user's blog on "the new physics" will likely show ads from a science magazine, whereas one that focuses on a particular sports team would likely show ads promoting sports apparel or memorabilia. But the user cannot choose, and certainly the user cannot block undesirable advertisers from her page.

This limitation, besides providing for possibility of incongruous and occasionally counterproductive ad placements, also leads to an inability of mainstream advertisers to take advantage of a most powerful aspect of social networks—which is precisely that social networks are self-organized market segments. People who network together, whether in a broad "network of friends" sense or in a narrow "network of first edition enthusiasts" sense, automatically define segments of great interest to advertisers, as these social networks generally will share much in common, including buying habits. But since the essence of social networks is their self-organization and, accordingly, their dynamic nature, traditional advertising models fall short.

All problems cited above in social networks also occur in other forms of virtual communities, such as online gaming communities, "virtual worlds" in which whole economic systems are operated online and members engage in "alternate lives".

What is clearly needed is a way to bring together the worlds of advertising and virtual communities in a way that serves the best interests of both key constituents—those who wish to advertise and those to whom advertisers are directed. Users and managers of virtual communities, should they be able to influence what, when and how is advertised to them, would be able to achieve the reasonable goal of having ads that addressed actual needs and preferences, and of to share in benefits thus created. And, in a continuation of the trend away from mass advertising that search-based ads illustrate, advertisers would be able to precisely target content at those social networks that are most predisposed to favorably react to the message, and to do so at a remarkably low cost, thus driving revenue per ad dollar up dramatically.

Furthermore, a parallel set of trends has developed in the area of business-to-business (B2B) e-commerce, including supply chain or eProcurement technologies. More and more businesses routinely procure the raw, processed and finished goods needed to satisfy the needs of their customers from business partners via electronic networks. Early progress in this direction took place through use of electronic data interchange (EDI), which allowed a limited number of typically very large enterprises to coordinate ordering and logistics of commodities and financial instruments. For example, manufacturers would use then-new technology of enterprise resource management software to coordinate purchase of raw materials in order to achieve dramatic productivity improvement through use of "just in time" and related management methodologies. With emergence of the Internet and the World Wide Web globally, the breadth and depth of activities performed using EDI expanded, and moved to the new massively interconnected world of the Web.

At the time of the invention, many B2B marketplaces have emerged in which communities of enterprises coordinate and compete with much greater speed and flexibility than was ever possible before. These changes have greatly improved resilience of the global market system, enabling it to withstand multiple shocks with surprisingly little disruption, since inventory levels are lower and more fluid and since disruptions are known and can be accommodated far more rapidly than before.

Unfortunately, these gains in B2B e-commerce have proceeded in relatively complete isolation from equally profound changes in how consumers communicate, and in particular from phenomena of virtual communities such as social networks. This is unfortunate, since virtual communities perform a natural and important function of filtering the vast complexity of human social interactions. In the past businesses have invested untold billions in a quest to understand natural groupings, or segmentations, of consumer populations, and to understand what consumers want. Most such activities are still performed using tools developed early in the age of mass media and advertising, which is to say during the period between 1920 and 1950. These tools include surveys, focus groups, data mining of consumer purchases, and the like. Social networks and similar virtual communities make it possible to engage consumers actively in answering timeless questions ("who are they?" and "what do they want?"). Today relatively little e-commerce leverages the extraordinary growth of the virtual community phenomenon described above, and partly this is because of its novelty. But also, businesses struggle because, while they can easily procure what they need from global networks of competing suppliers, they enjoy no such easy access to the highly fragmented—but also highly segmented—world of virtual communities of consumers.

Accordingly, it is an aim of the present invention to provide a system and a method for linking B2B eProcurement markets with processes for selling through virtual communities, for example by monetizing user-generated content that dominates these communities, and to provide vendors and advertisers a method to promote and sell products into and through virtual communities using marketing events and promotions, community-generated and user-generated content, and targeted advertisements.

SUMMARY OF THE INVENTION

In an effort to solve the problems described above of linking business-to-business (B2B) eProcurement systems to virtual communities, the inventors conceived of the instant invention. Specifically, they conceived of the notion of augmenting user interfaces used by merchants in procuring goods for further sale by tightly linking them to virtual communities, thus providing merchants the ability to use the same interface to manage product promotions and sales into virtual communities.

More particularly, in a preferred embodiment of the invention an e-commerce system, comprising a master console software application executing on a first network-connected server and accessible to a plurality of external systems used by merchants, a shopping cart software application executing on a second network-connected server and coupled to the first server, and interface software executing on the second server for interacting with content associated with a first user is disclosed, wherein a merchant interacts with the master console software application to load information about a product available for promotion and sale by the first user, the master console software application makes that information available to the shopping cart software application, and the interface software provides information and code related to the specific product to the content, the code compatible with the content, and upon the code being activated in the content by a second user, the second user is connected to the shopping cart software application, and is thereby enabled to buy the product.

In another preferred embodiment the master console software application and the shopping cart software application are executed on a single server.

In yet another preferred embodiment, a merchant further interacts with the master console software application to provide specific information pertaining to promotion of the product, and the product promotion information is made available to users via the shopping cart software application, thereby enabling users to embed approved advertisements in content.

In a further preferred embodiment a merchant further interacts with the master console software application to provide specific information pertaining to surveys, and the survey information is thereupon made available to the shopping cart software application; further characterized in that the shopping cart software application executes among its user base surveys based at least in part on the survey information provided by the merchant, and the survey results are provided at least in part back to the merchant via the master console software application.

BRIEF DESCRIPTION OF THE DRAWING FIGURES

DETAILED DESCRIPTION

The inventors provide a system and a method for combination of eProcurement and virtual communities in order to allow each to take advantage of capabilities of the other. In particular, it is desirable for merchants to be able to augment well-understood and widely adopted capabilities of modern eProcurement networks with ability to directly sell their products and services into virtual communities. And it is desirable for virtual community operators and members to facilitate targeted marketing of products and services appropriate for the members of the virtual community, as a means to monetize ability of the virtual community to aggregate large numbers of users and to enable those users to self-select into subnetworks based on common relationships, interests, geographical locations or other factors. It being one of the clear advantages of virtual communities that this self-assembly takes place naturally, it is attractive to marketers to leverage these ready-made market segments, many of which would never be identified by traditional market segmentation strategies.

Figure 1:
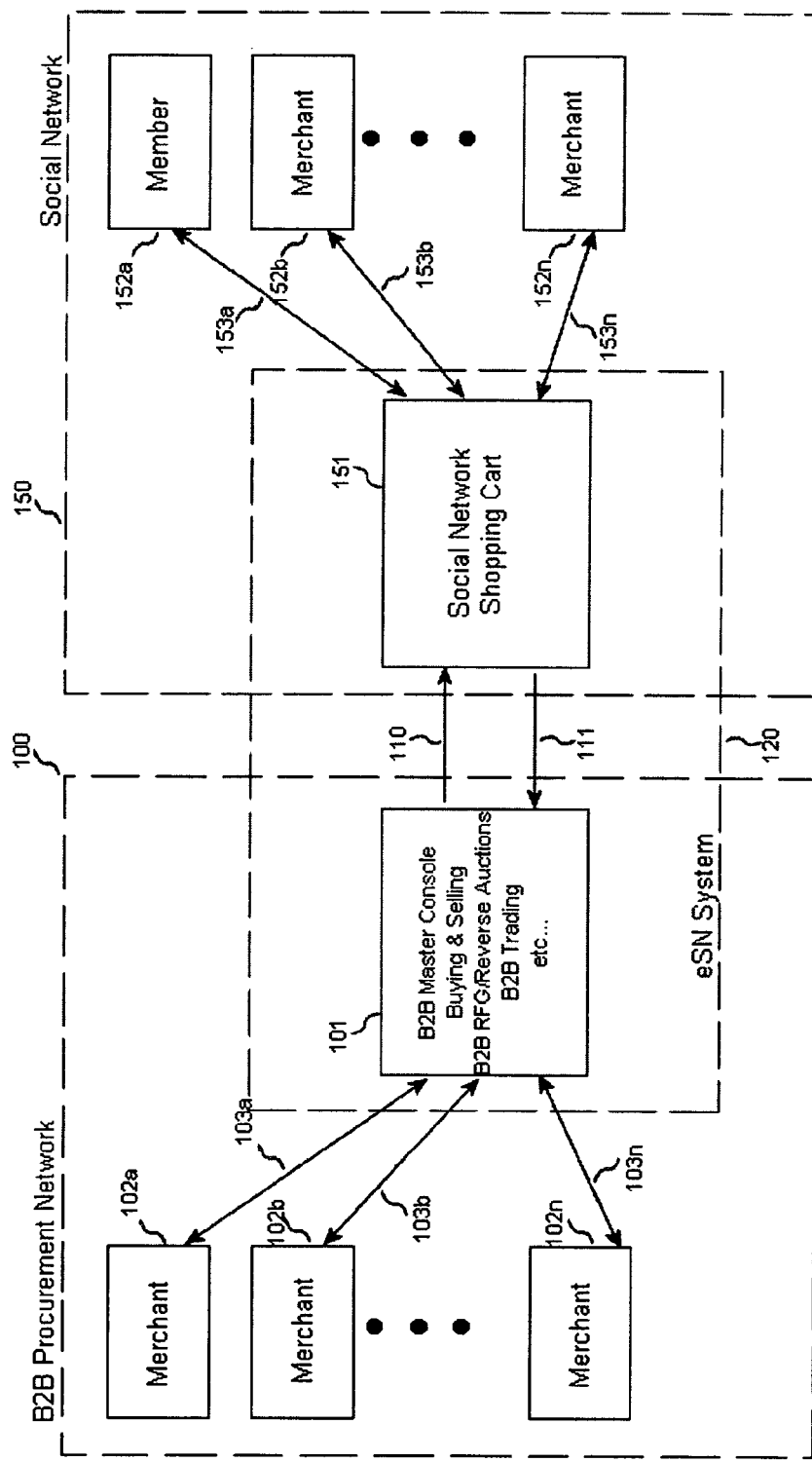
FIG. 1 is a block diagram of components of the invention, highlighting different roles played in carrying out the invention.

FIG. 1 illustrates one embodiment of the invention. A business-to-business ("B2B") eProcurement network 100 is coupled to a virtual community 150 via an integrated eProcurement-to-virtual community (e2VC) system 120. The e2VC system comprises a Master B2B Console 101, which is a single point of configuration and control for merchants (102a through 102n) who are members of the B2B eProcurement network. Using the Master B2B Console, merchant members can conduct all the types of activities normally associated with B2B eProcurement networks, including but not limited to buying and selling products, services and commodities, B2B requests for quotations (RFQ), reverse auctions, B2B trading, etc. Merchants 102 access the Master B2B Console via the Internet or other data network connections 103. The Master B2B Console also comprises a Universal Shopping Cart 151, which acts in an analogous role for virtual network 150 as the Master B2B Console 101 does for the B2B Procurement network 100. Specifically, members (152a through 152n) of the virtual community are provided the ability to buy products placed in the universal shopping cart 151 by the plurality of merchants 102, and to do so from within the familiar user interfaces of the virtual community 150. Interactions with the universal shopping cart are via data network connections 153, which can be the Internet but are not required to be so; any wide-area networking technology known in the art can fulfill the function of data network connections 153. Information concerning products to be marketed through the virtual community is provided to universal shopping cart 151 from the Master B2B Console via data connection 110, and transactional data from the universal shopping cart 151 is passed back to Master B2B Console 101 via data connection 111. It should be noted that data connections can be combined, or subdivided into special-purpose data connections such as for reporting, without departing from the spirit and scope of the present invention; two data connections are shown for clarity and as an exemplary embodiment.

Figure 2:
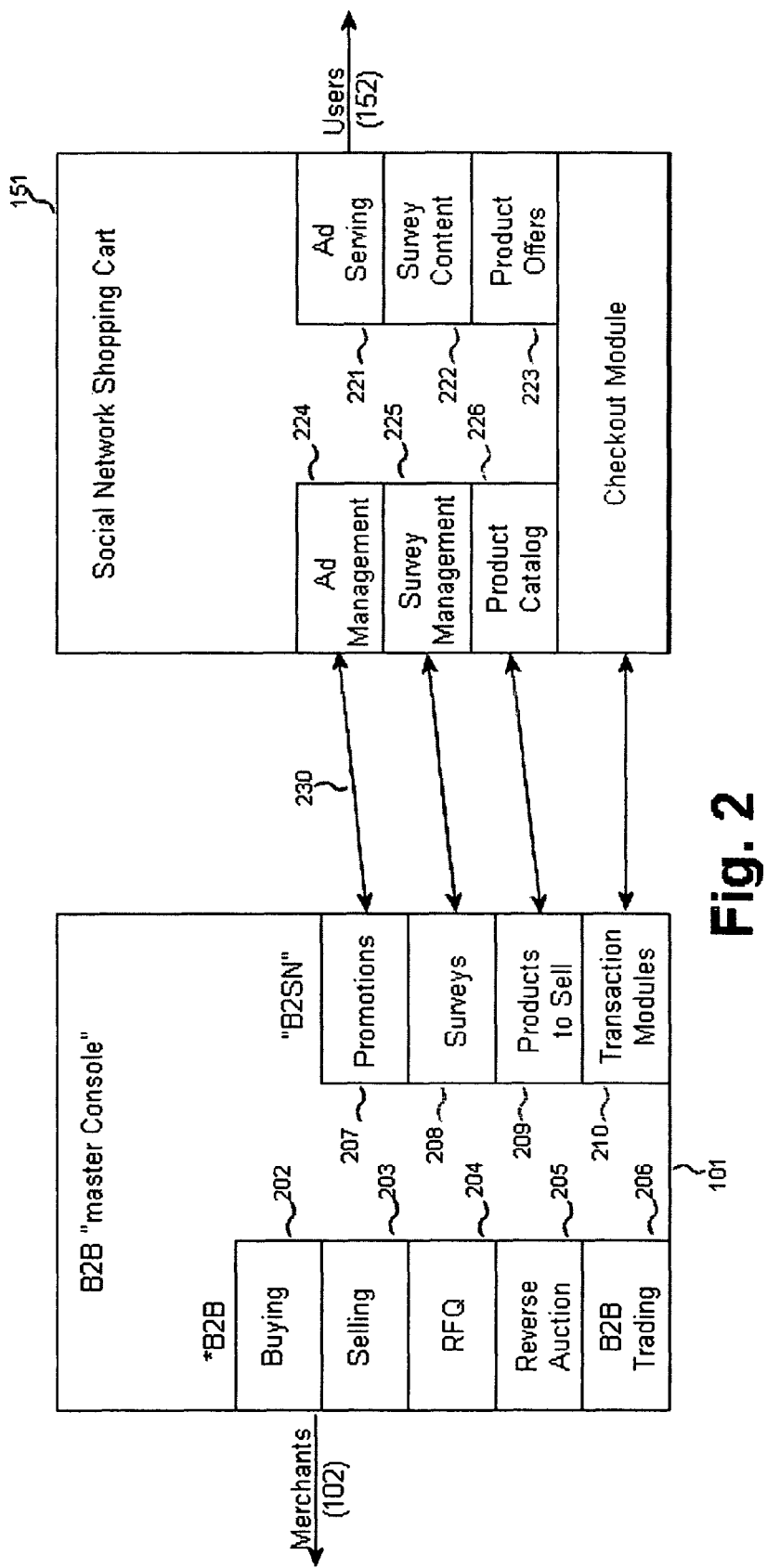
FIG. 2 is a detailed block diagram of interfaces of the invention that connect eProcurement networks and social networks in various embodiments.

FIG. 2 provides a more detailed view of the interactions that take place between Master B2B Console 101 and universal shopping cart 151 in an embodiment of the invention. As mentioned before, traditional B2B functions are carried out by merchants 102 via specific modules of the Master B2B Console 101, including but not limited to buying 202, selling 203, RFQ support 204, reverse auctions 205 and B2B trading 206. Additional "Business to Virtual Community" of "B2VC" modules of the invention include modules for product promotions 207, user surveys 208, catalog information concerning products available to sell 209, and transaction modules for executing and fulfilling sales order 210. Generally, B2VC modules in Master B2B Console 101 have counterparts in the Universal Shopping Cart 151, to which they connect via data connections 230 (another example of the data connectivity illustrated by connections 110 and 111 in FIG. 1). Exemplary counterpart modules include a module for advertisement and promotional campaign management 224, one for user survey management 225, another for the shopping cart's product catalog 226, and the shopping cart's checkout module 227.

Merchant users of the e2VC system are able to manage all of their activities both for traditional B2B transactional purposes and for marketing to targeted virtual communities in one unitary user interface, providing a capability that has not existed before. In the art today, business users must conduct their eProcurement transactions using a dedicated eProcurement site (there are many) and then use a totally different site and set of processes to perform their business-to-consumer transactions. E2VC allows business a unique ability of using one master console for all of their eProcurement needs while simultaneously allowing them to sell products to and through virtual communities, which represent extremely valuable new markets insofar as the participants in virtual communities tend to self-organize into identifiable market segments with common needs and desires. One challenge which the instant invention addresses is that there is currently no way to effectively and proactively market to those dynamic, self-organizing market segments other than using tag-driven ad campaigns. Because of the variety of services which can be provided via the Master B2B Console, businesses are able to manage automated advertising campaigns, promotions, and member surveys with virtual communities that are e2VC-enabled. It should also be noted that the pairings shown in FIG. 2 between Master B2B Console 101 and universal shopping cart 151 are not necessarily or even primarily exclusive; a merchant may choose to participate in more than one B2B eProcurement network, and he may choose to market to more than one social network from any given B2B eProcurement network.

Users 152 of the virtual community also interact with several distinct modules within the universal shopping cart of the invention, including receiving served ads while viewing content from within the virtual community from ad serving module 224, responding to surveys provided by survey content module 225, viewing product information and options provided via the product offers module 223, and checking out to complete purchases made using the universal shopping cart using checkout module 227. It should be understood that these are exemplary functions, and there may be more or less functions provided by the universal shopping cart, or by equivalent virtual community-hosted software applications, in embodiments of the invention. Some important elements are the existence of integration via links 230 to the Master B2B Console and of at least the checkout module 227 for executing transactions within the virtual community. Furthermore, merchants may promote products through virtual communities from the Master B2B Console using applications other than the universal shopping cart, for example by placing context-sensitive ads within content hosted by the virtual community using promotion module 207 and a software application other than a universal shopping cart that provides ad management module 224.

Figure 3:
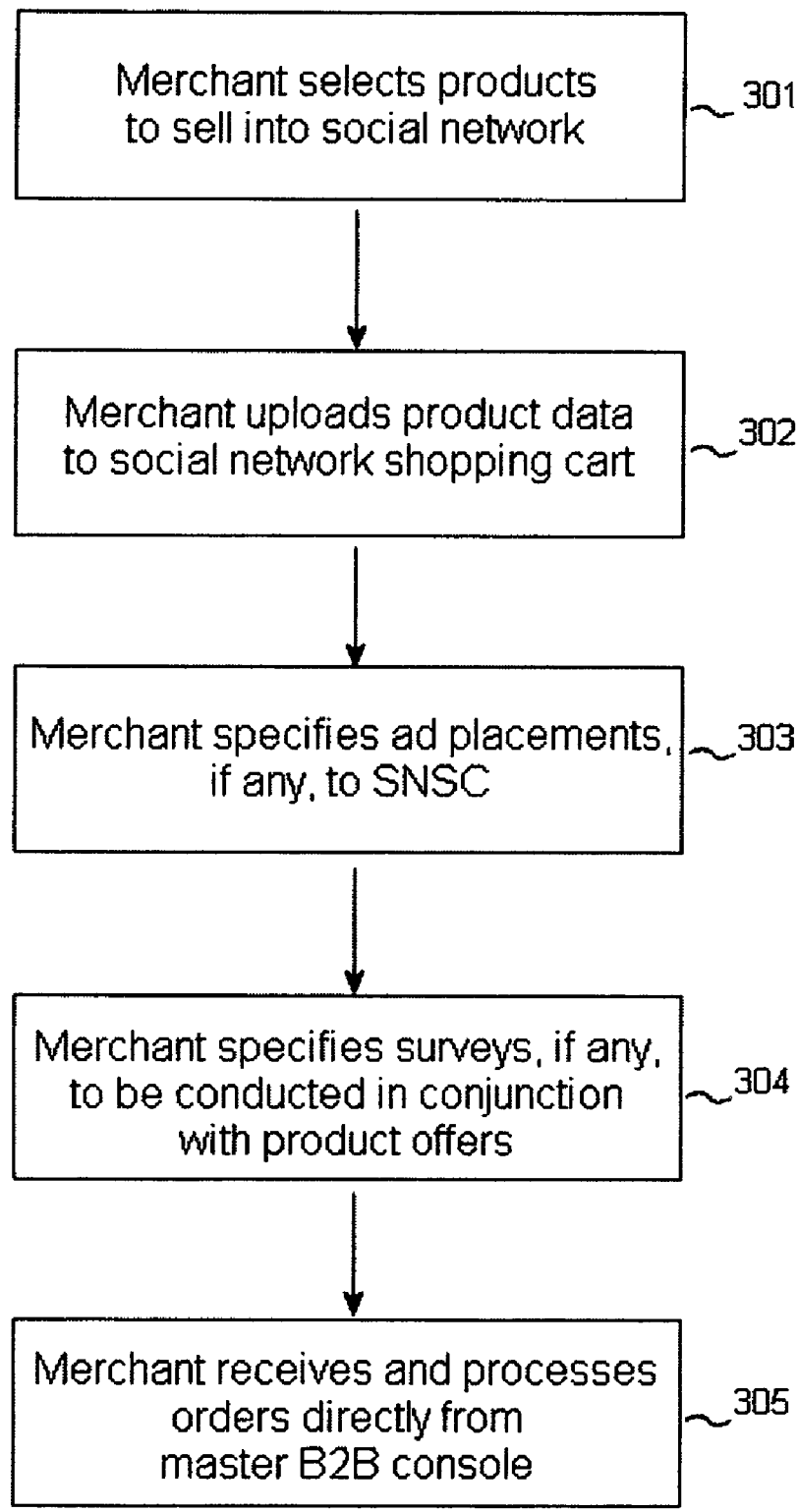
FIG. 3 is a process flow diagram of a method of the invention in which merchants market products for sale into one or more social networks.

FIG. 3 provides an overview of an exemplary method, according to an embodiment of the invention, that a merchant would go through to market products for sale through one or more virtual communities. First, the merchant selects products to sell into the virtual community in step 301. Typically product selection would be done with a view toward leveraging unique demographics or preference patterns of a given virtual community. For very large, horizontal virtual community, this function may be performed within the virtual community itself, either by its users or by marketing specialists who analyze the demographics and self-organizing groups of the social network. Merchants may, according to an embodiment of the invention, pass on parameters such as target demographics, content keyword tags that should be targeted, media types or content types that should be targeted, and possibly collaborative filtering type information (for example, market this product to users of your community who have shown a strong interest in foreign cars). Once product selection has been done (and this may well be an ongoing process, or a batch process, depending on the merchant), the product data is uploaded at step 302 via Master B2B Console 111 to universal shopping cart 151. The merchant may further specify details (step 303) about advertisement placements, quantities, and targeting to be executed in virtual community 150 by universal shopping cart 151; this function is also performed via Master B2B Console 111. Additionally, the merchant may specify what fee she is willing to pay to the virtual community for selling the product or products in question. The fees may vary from merchant to merchant and product to product. Furthermore, the merchant may specify user survey policies in optional step 304. The merchant may conduct any desired surveys in connection with the product offers, again through the devices of universal shopping cart 151 or equivalent virtual community software application. Finally, the merchant receives and processes orders 305 directly from Master B2B Console 111, which in turn receives order information from universal shopping cart 151.

Figure 4:
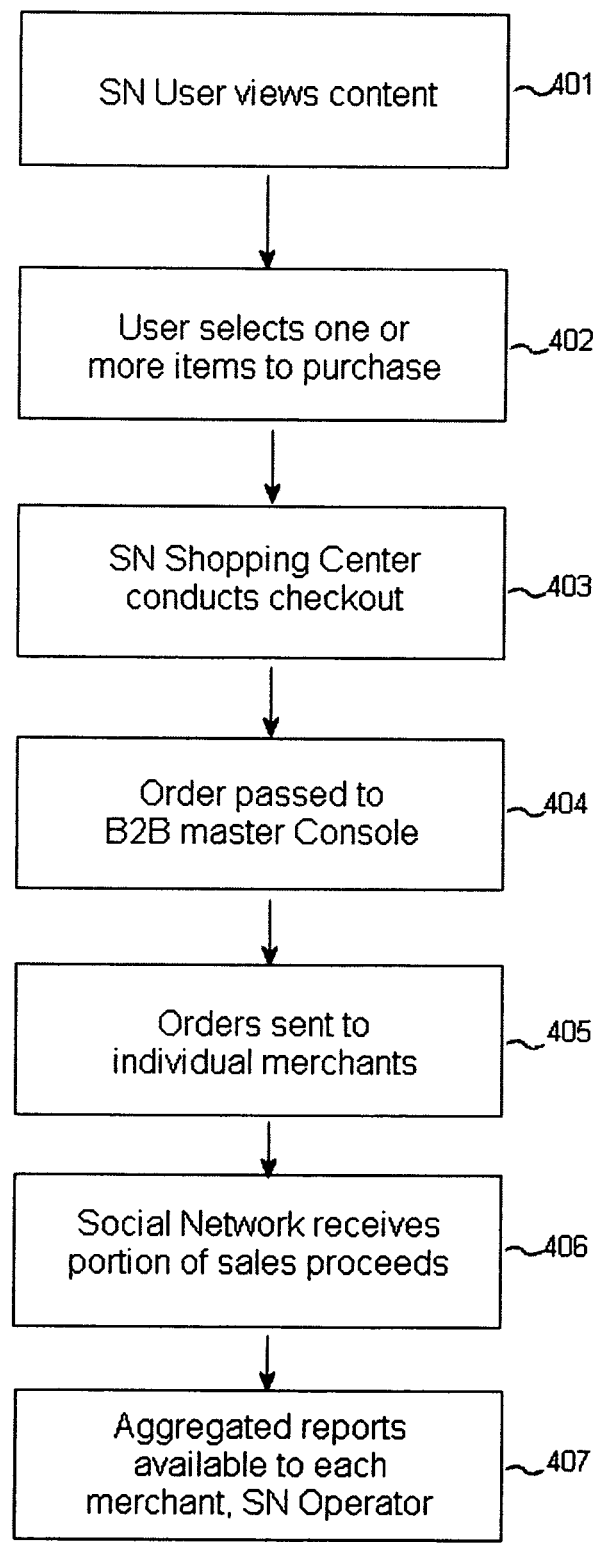
FIG. 4 is a process flow diagram of a method of the invention in which social network users view products and place orders from merchants.

FIG. 4 illustrates a method of an embodiment of the present invention which focuses on a chain of events controlled by members of virtual community 150. When a member of the virtual community views content (step 401) within the virtual community's site, the user may be shown one or more advertisements or other product placements within the content of the virtual community. If, in response to these ads or placements, the user decides to purchase one or more items, the user may select item or items 402 and continue interacting normally with the virtual community. When the user is ready to execute a purchase, the user chooses to go to universal shopping cart checkout 303. By storing a catalog of available products from a plurality of merchants and making those products, and optionally advertising about those products or their vendors, available as part of the overall virtual community content experience, the universal shopping cart acts not only as a shopping cart but also as a "virtual store" that is seamlessly woven into the content fabric of the virtual community. It is not seen by the user until it is needed to execute a purchase using the checkout module 227. When the universal shopping cart conducts the checkout for the user, carrying out the normal steps of allowing the user to specify form of payment (and verifying payment validity), selecting from a plurality of shipping options, and the like, the universal shopping cart sends the finished order directly to the Master B2B Console in step 404. The Master B2B Console then parses the transaction and sends the relevant product orders to each affected merchant (step 405). Additionally, in step 406, the Master B2B Console consults configuration information concerning the fees to be paid for each sale transaction, and these fees are credited to the virtual community by the Master B2B Console, effectively by conducting a payment transaction back to the particular virtual community. Finally, the Master B2B Console prepares aggregated reports on transactions conducted in step 407. These reports are made available, as appropriate, to merchants (for their own transactions only), virtual community operators (again, only for transactions conducted within their communities) and the e2VC operator (which could be a B2B eProcurement network offering value-added services to its merchant customers, or a virtual community operator using the current invention to monetize its user base by encouraging selling into the community by one or more B2B eProcurement networks and their members, or even an independent third party who operates the e2VC of the current invention as a service to both B2B eProcurement network operators and virtual community operators.

e2VC networks can operate with virtual communities other than the familiar online examples such as online social networks. For example, using internet protocol television (IPTV), virtual communities can be formed in a manner analogous to, but different than, what happens on the Internet. Viewers of highly targeted programming can establish "virtual channels" that may consist of, for example, a mix of user-generated and professionally-generated content, and may include a high degree of interactivity. Mobile phone users may form "friends and family" and similar types of social networks. Members of an organization may agree to establish an "always on" conference bridge using conventional telephony, and members may join and leave the conference at will. Multilevel marketing companies, or network marketing companies, often use networks of associates who conduct home parties centered on particular products or services. In each of these non-traditional cases, a virtual community is established whose membership is self-organized and dynamic, and in each case the virtual community constitutes a highly desirable, if sometimes ephemeral, target market segment for appropriate product and service vendors. The e2VC concept is applicable in all of these cases. What is needed is a data communications channel from the universal shopping cart to at least one of the members of the virtual community (for example, the person leading a home party) for the passing of product and promotion data from the shopping cart to the group and for executing orders in the shopping cart.

Figure 5:
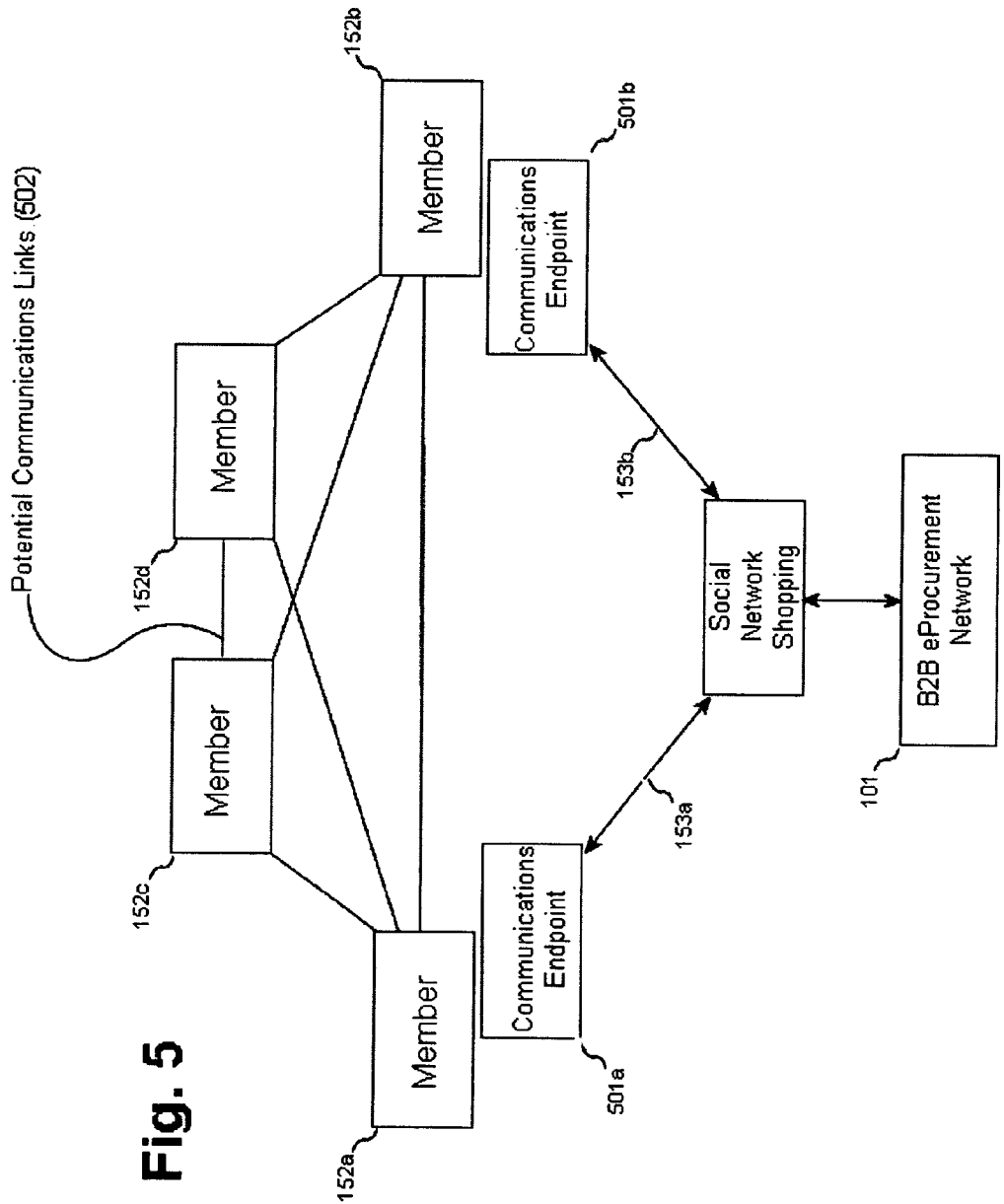
FIG. 5 is an illustration of how an e2VC system and method in an embodiment of the present invention can be used with an offline social network.

FIG. 5 is an illustration of how the e2VC system and method of the present invention can be used with an offline virtual community such as those just discussed. Universal shopping cart 151 is, as before, connected directly to B2B eProcurement network 101 to enable the e2VC invention. But unlike previous examples, only some of the members (152*a* and 152*b*) of the perhaps spontaneous social network consisting of a plurality of human users (152*a*, 152*b*, 152*c* and 152*d* in this example) are connected via a communications endpoint (501*a* and 501*b*, respectively) to the universal shopping cart 151 via communications links 153a and 153b. Communications endpoints 501 could be telephones, mobile phones, wirelessly connected laptops, PDAs with satellite connections, etc.—any device which can establish a communications link to the universal shopping cart 151. The humans in the virtual community of FIG. 5 communicate with each other over some other communications means 502, which could be one of plain old telephone calls, face to face interactions as at a home party, or even hand signals on a crowded trading floor. In a virtual community such as that shown in FIG. 5, the humans interact freely, and one or more (there must be at least one) of the members of the group/virtual community interacts with universal shopping cart 151 via his or her communications endpoint. It is not even necessary for communications links 153 to be "data links"; a plain old phone call could work if universal shopping cart 151 is enabled with a voice application platform, which is well known in the art. In these cases, which might be used in the conferencing example above, some members speak to universal shopping cart 151, their speech is recognized by any of a number of well-known speech recognition systems, and responses back to them are converted into speech using any of a number of well-known text-to-speech systems. One of the points of FIG. 5 is that tight linkage of eProcurement and virtual communities, or e2VC as it is termed herein, is an important aspect of this invention.

It will be appreciated that the examples provided in this specification are exemplary in nature and should not limit the invention beyond what is claimed.

Figure 6:
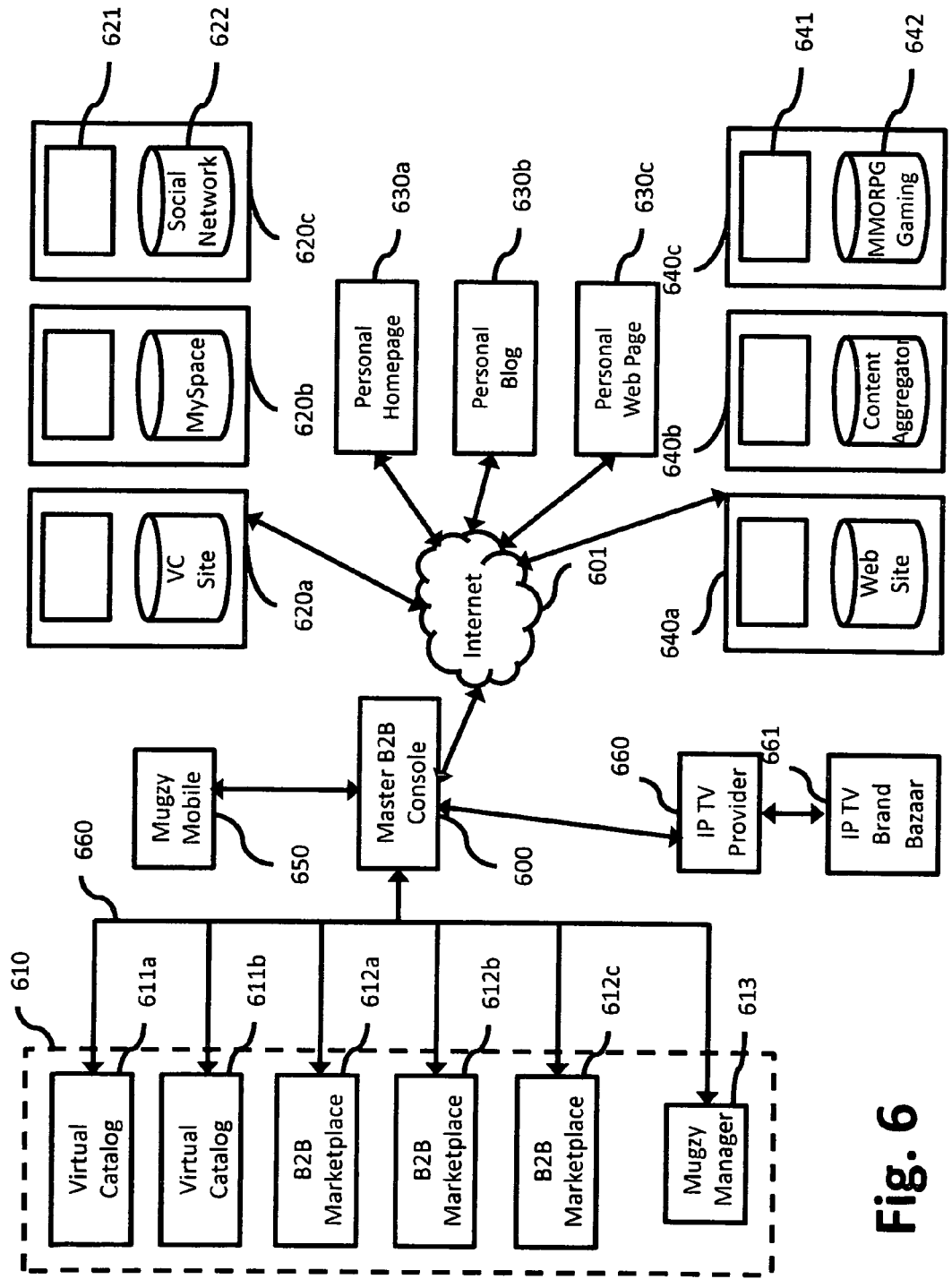
FIG. 6 is an illustration of another exemplary embodiment of the invention.

FIG. 6 illustrates yet another embodiment of the present invention referred to by the inventors as a "Brand Bazaar". In a particular embodiment the Brand Bazaar services are provided through a website at a URL BrandBazaar.com 600. BrandBazaar.com uses the e2VC model for site services and extends the e2VC process by allowing one or more external sites 610 to participate through a set of interfaces 660. These interfaces are open to third parties and can be application programming interfaces (APIs), web services, or the like. It will be understood by one practiced in the art that there are multiple common ways of interfacing two ecommerce servers using the Internet 601 (not shown specifically in FIG. 6) or dedicated networks. External sites can be for example virtual or online catalogs 611a-b, B2B marketplaces 612a-c, or any similar site or service from which one or more merchants submit products for possible promotion by end users to the Master B2B Console 600, or to receive notifications of sales made as a result of end user endorsements made possible through the joint operation of the Master B2B Console 600 and one or more universal shopping carts hosted in virtual communities 620a-c or other online services 640a-c. For example, an electronics manufacturer makes certain of its products available for endorsement, promotion or sale by end users in association with their user-generated content or third party content (possibly from content aggregator 640b such as YouTube), by uploading relevant product information via interfaces 660 to the Master B2B Console 600. Users desiring to promote a manufacturer's products can view them in a universal shopping cart in one or more virtual communities 620a-c or other online services 640a-c and can select one or more products to endorse or promote. The user may optionally promote selected products in or associated with their own user-generated content or in or associated with third party content. Other users in viewing content containing or associated with product endorsements or promotions may select products to purchase, and make purchases including such normal activities as selecting quantities, shipping methods, insurance options, and the like. In an embodiment of the invention, actual fulfillment of consumer purchase orders made through a universal shopping cart is carried out by a different external site 610 than the one from which the product was originally entered into the E2VC process via the B2B Master Console 600. For example, if the product is an electronics product from a manufacturer, and the manufacturer had directly submitted the product to the Master B2B Console 600 using an interface 660, a purchase made by a consumer could be routed by the Master B2B Console 600, via interfaces 660, to a third-party fulfillment specialist 612a-c that actually coordinates payment, funds transfer, shipping and any required follow-up with the purchaser. Such arrangements are common in trade, and arrangements between manufacturers and third-party fulfillers could be made offline, through an electronic B2B Marketplace 612a-c, or directly within the E2VC process using a Mugzy Manager software module 613 or similar software associated with the Master B2B Console 600.

It is an important attribute of the instant invention that one or a plurality of external ecommerce facilities 610 can separately or jointly upload product information, promotional material, commercial information such as pricing, quantities, contractual requirements, lists of banned consumer endorsers, lists of products or web sites with which a given product is not to be associated, and the like, to the Master B2B Console. Endorsing users can access this information in order to make informed selections of products they wish to endorse (from the set of products which they are allowed by the Master B2B Console to see), from within a virtual community such as MySpace 620b, or another social network 620c, or a content aggregator 640b such as YouTube, or a gaming community such as a massively multiplayer online roleplaying game 640c, or indeed any virtual community Master 620a or indeed any website 640a l to interoperate with the Master B2B Console 600 via the Internet 601.

User endorsements or promotions of products can be viewed by other users via Mugzy components 621 and 641 that are provided by virtual communities 620a-c or other online services 640a-c, or they can embedded within a user's own homepage 630a, a user's personal blog 630b, or any personal web page or other online content controlled by the user 630c, or indeed via Mugzy Mobile 650 interfaces on a mobile phone or via IP TV. In an embodiment of the invention, an IP TV provider 660 interacts with a Master B2B Console 600 to obtain information about products and promotions available for endorsement in user content, and makes this information available in its own Brand Bazaar 661, which is in effect a separate Master B2B Console 600 hosted by the IP TV service provider 660. In this example, the IP TV service provider 660 may choose to operate a shopping channel that directly sells products made available through an external Master B2B Console 600 (this gaining access to a large variety of products made available by sources such as manufacturers with whom the IP TV service provider 660 may have no formal business relationship), or that allows consumers to sell products by providing content and associated product endorsements (for example, a funny home videos show with consumer-generated product endorsements could be hosted by the IP TV service provider 660 in which viewers would be able to interactively view detailed information and purchase endorsed products using the IP TV Brand Bazaar 661 without leaving the show or having to use their computer to go online).

It can be seen that a wide variety of arrangements of product suppliers, content providers, and content hosters are possible under the invention, with a key element being the ability of end users to select content of their own or another's creation for use as a vehicle within which, or associated with which, to endorse products they believe in, such that other users may view the selected content and the associated endorsements and optionally view more information or purchase endorsed products without leaving the endorsing user's content.

All of the embodiments described in this disclosure are exemplary in nature and should not be construed as limitations of the invention. The invention is limited only by the scope of the claims that follow.

What is claimed is:

1. An e-commerce system, comprising:
a master console software application executing on a first network-connected server and accessible to a plurality of external systems used by merchants; and
a shopping cart software application executing on a second network-connected server and coupled to the first server; and
interface software executing on the second server for interacting with content associated with a first user;
wherein a merchant interacts with the master console software application to load information about a product available for promotion and sale by the first user, the master console software application makes that information available to the shopping cart software application, and the interface software provides information and code related to the specific product to the content, the code compatible with the content, and upon the code being activated in the content by a second user, the second user is connected to the shopping cart software application, and is thereby enabled to buy the product.

2. The system of claim 1 wherein the master console software application and the shopping cart software application are executed on a single server.

3. The system of claim 1 wherein a merchant further interacts with the master console software application to provide specific information pertaining to promotion of the product, and the product promotion information is made available to users via the shopping cart software application, thereby enabling users to embed approved advertisements in content.

4. The system of claim 1 wherein a merchant further interacts with the master console software application to provide specific information pertaining to surveys, and the survey information is thereupon made available to the shopping cart software application; further characterized in that the shopping cart software application executes among its user base surveys based at least in part on the survey information provided by the merchant, and the survey results are provided at least in part back to the merchant via the master console software application.

5. An e-commerce system, comprising:
a master console software application executing on a network-connected server and accessible to a plurality of external systems used by merchants; and
interface software executing on the server for interacting with a virtual community software application;
wherein a merchant interacts with the master console software application to load information about a product available for promotion and sale by a first user, the interface software makes that product information available to the virtual community software application, and the interface software receives information back from the virtual community software application when a consumer chooses to buy the product, and the master console automatically makes this purchase information available to the merchant.

6. The system of claim 5 wherein the merchant further interacts with the master console software application to provide specific information pertaining to promotion of the product, and the product promotion information is made available to users via a virtual community software application, thereby enabling users to embed approved advertisements in virtual community content.

7. The system of claim 5 wherein the merchant further interacts with the master console software application to provide specific information pertaining to surveys, and the survey information is thereupon made available to a virtual community software application; further characterized in that survey results provided back from the virtual community software application are provided at least in part back to the merchant via the master console software application.

8. A method for e-commerce, comprising the steps of:
(a) loading product information into a master console software application executing on a network-connected server from a plurality of connected merchant systems;
(b) loading the product information from the master console software application into a shopping cart software application;
(c) making the product information available via the shopping cart software application to a first user for inclusion by the first user in content; and
(d) upon receipt of a request, initiated from the content by a second user, connecting the second user to the shopping cart software application, thereby enabling the second user to purchase the product.

* * * * *